(12) United States Patent
Turk

(10) Patent No.: US 9,231,999 B2
(45) Date of Patent: Jan. 5, 2016

(54) MULTI-LEVEL LOAD BALANCER

(75) Inventor: Mladen Turk, Zagreb (HR)

(73) Assignee: Red Hat, Inc., Raleigh, NC (US)

( * ) Notice: Subject to any disclaimer, the term of this patent is extended or adjusted under 35 U.S.C. 154(b) by 2126 days.

(21) Appl. No.: 11/946,667

(22) Filed: Nov. 28, 2007

(65) Prior Publication Data
US 2009/0138582 A1 May 28, 2009

(51) Int. Cl.
H04L 29/08 (2006.01)

(52) U.S. Cl.
CPC ........ H04L 67/1002 (2013.01); H04L 67/1023 (2013.01); H04L 67/288 (2013.01)

(58) Field of Classification Search
CPC .................................................. H04L 67/1002
USPC ........................................................ 709/223
See application file for complete search history.

(56) References Cited

U.S. PATENT DOCUMENTS

| 5,828,847 A * | 10/1998 | Gehr et al. ..................... 709/239 |
| 6,950,848 B1 * | 9/2005 | Yousefi'zadeh .............. 709/203 |
| 7,590,149 B1 * | 9/2009 | Bharali et al. ................. 370/468 |
| 2006/0013136 A1 * | 1/2006 | Goldschmidt et al. ........ 370/235 |

* cited by examiner

*Primary Examiner* — Karen Tang
(74) *Attorney, Agent, or Firm* — Lowenstein Sandler LLP (57) ABSTRACT

The multi-level load balancing system receives requests for resources provided by any of a plurality of resource nodes. The multi-level load balancing system receives a first result from a first load balancing module that orders each of the plurality of nodes that are available to service the request based on a first algorithm. The multi-level load balancing system then receives a second result from a second load balancing module that orders each of the plurality of nodes that are available to service the request based on a second algorithm. The multi-level load balancing system combines the first result and the second result to form a third result that is uses to select one of the plurality of resources nodes to service the request.

18 Claims, 7 Drawing Sheets

MULTI-LEVEL LOAD BALANCER

TECHNICAL FIELD

Embodiments of the present invention relate to management of connections between clients and servers. Specifically, the embodiments relate to a method and apparatus for balancing the number of connections handled by each server in a pool of servers.

BACKGROUND

Figure 1:
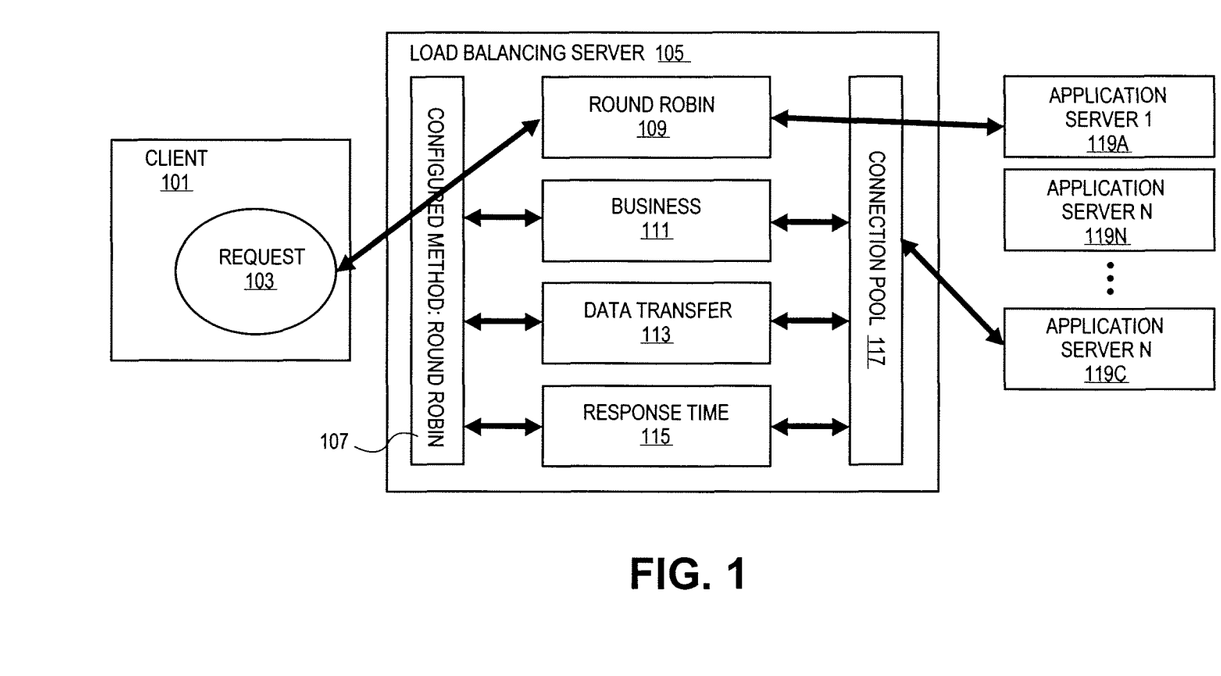
FIG. 1 is a diagram of a system for servicing resource requests utilizing a single load balancing module.

A standard resource management scenario is illustrated in FIG. 1. A client computer 101 requires the use of a resource that is provided by a group of servers 119A-119C. The required resource can be available on any subset of the group of servers 119A-C. In the illustrated example, the servers are application servers 119A-C that provide a particular application or group of applications to a requesting client.

Access to the servers 119A-C is controlled by a load balancing server 105. The load balancing server 105 receives a resource request 103 from a client computer 101 and determines which of the available servers 119A-C will service the request. The load balancing server 105 relies on one of a group of available load balancing modules to make the selection of the server to service the request 103. Selection of the load balancing module is performed by or based on a configuration module 107. The connections to the servers are managed by a connection pool module 117.

The load balancing modules can include a round robin module 109, business module 111, data transfer module 113, and response time module 115. Each module uses a separate algorithm for selecting a server. The round robin module 109 uses a round robin selection scheme. The business module 111 selects the least busy server. The data transfer module 113 selects the server with the lowest data transfer load. The response time module 115 selects the server with the best response time.

The configuration module 107 selects a single load balancing module and executes it to select a server to handle a request. The configuration module 107 is configured by a system administrator. The configuration module 107 is a simple data structure that calls or indicates the load balancing module that is currently configured for use by the administrator. After the selected load balancing module executes and selects a server, a connection for the selected server is obtained from the connection pool 117 and the request is serviced by the selected server through the connection.

DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Described herein is a method and apparatus for balancing a load from a set of clients requesting resources from a set of servers offering those resources. The load balancing system, referred to herein as a 'multi-level load balancing system,' offers an administrator more options in configuring and optimizing the balancing of the load by combining different load balancing modules and algorithms. Combining the load balancing modules and algorithms generates server selections that take into account more operational factors and offer a higher level of granularity and sophistication in the configuration of the load balancing. The multi-level load balancing system receives requests for resources provided by any of a plurality of resource nodes. The multi-level load balancing system receives a first result from a first load balancing module that orders each of the plurality of nodes that are available to service the request based on a first algorithm. The multi-level load balancing system then receives a second result from a second load balancing module that orders each of the plurality of nodes that are available to service the request based on a second algorithm. The multi-level load balancing system combines the first result and the second result to form a third result that is used to select one of the plurality of resources nodes to service the request.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be born in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "selecting," "combining," "displaying," "adding," "receiving," "traversing," "maintaining," "accepting," "assigning," "requesting," "releasing," "closing," "notifying," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer readable storage medium includes any mechanism for storing information in a form readable by a computer. For example, a computer readable storage medium includes read only memory ("ROM"), random access memory ("RAM"), magnetic disk storage media, optical storage media, flash memory devices or other type of computer readable storage media.

Figure 2A:
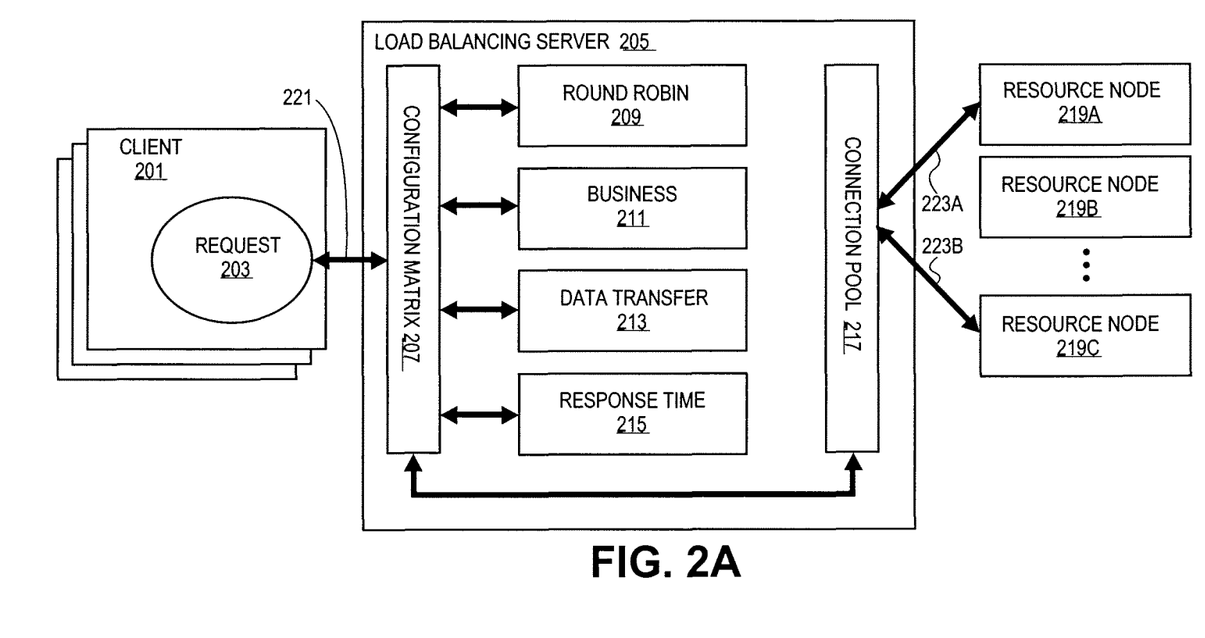
FIG. 2A is a diagram of a system for servicing resource requests utilizing multiple load balancing modules.

FIG. 2A is a diagram of a system for servicing resource requests utilizing multiple load balancing modules. A multi-level load balancing system includes a set of clients 201, a load balancing server 205 and a set of resource nodes 219A-219C. A 'set,' as used herein, refers to any positive whole number of items including one item.

Any number of client 201 machines or applications can connect to a load balancing server 205 to request resources. The client 201 machines can be any type of computing devices including desktop or laptop computers, servers, hand held devices, console devices, consumer electronics devices and similar devices. The clients 201 can request any type of resource including web pages, databases, application servers, processing resources and similar resources. The requests 203 can have any format or size and any number of requests 203 can be made by each client 201. The client 201 can communicate with a load balancing server 205 and resource nodes 219A-C over a network connection 221. The network connection 221 can by any type of network connection over any type of network including a local area network (LAN), wide area network (WAN), such as the Internet, or any similar network. The network connection can be shared or separate between the clients 201.

The load balancing server 205 can be hosted by any type of machine including a dedicated server, workstation, desktop or similar computing device. The load balancing server 205 receives resource requests from clients 201 and selects a resource node from the set of available resource nodes 219A-C to service each request. The load balancing server 205 prevents any one resource node from becoming overburdened by requests and spreads the load amongst the available resource nodes 219A-C. The load balancing server 205 can be configured by a system administrator or similar user to utilize a set of load balancing modules to select an available resource node 219A-C.

The load balancing modules each provide a distinct methodology or algorithm for selecting an available resource node 219A-C. A round robin module 209 selects resources nodes 219A-C in a round robin pattern. A business module 211 selects resources nodes 219A-C based on the relative activity of each resource node 219A-C. The least active resource node 219A-C is selected to service each request. The data transfer module 213 selects the resource node 219A-C that has the current lowest data transfer load. The response time module 215 selects the resource node 219A-C that has the quickest current response time, which is influenced by the load it is carrying and in some cases the location of the resource node relative to the requesting client.

A configuration matrix module 207 is a program or data structure that determines a multi-layered usage of the load balancing modules. The administrator or similar user can utilize the configuration matrix module 207 to combine and weight the output of each of the load balancing modules. This configuration allows the administrator or user to create a more complex, precise and nuanced load balancing scheme using the load balancing modules as building blocks. Once a selection of a resource node 219A-219C has been made, then the load balancing server 205 and/or the configuration matrix 207 obtains or establishes a connection with a selected resource node by accessing a connection pool 217. The request 203 can then be communicated to the resource node 219A-C and the resource node 219A-219C can service the request and provide the response over the established connection.

Resource nodes 219A-C can be hosted by any type of computing device including a dedicated server, workstation, desktop or similar computing device. Each resource node can provide any set of resources including databases, processing resources, storage resources, application resources (e.g., as an application server), web pages (e.g., as a web server) or similar resources. The set of resource nodes 219A-C can each provide the same resources, separate resources or any combination thereof. The resource nodes 219A-C communicate with the load balancing server 205 over a network connection 223A,B. Each resource node 219A-C can be connected to the load balancing server 205 through a separate connection 223A,B or through shared connections. The network connections 223A,B can be provided over any type of network including a LAN, WAN, (e.g., the Internet) or a similar network.

Figure 2B:
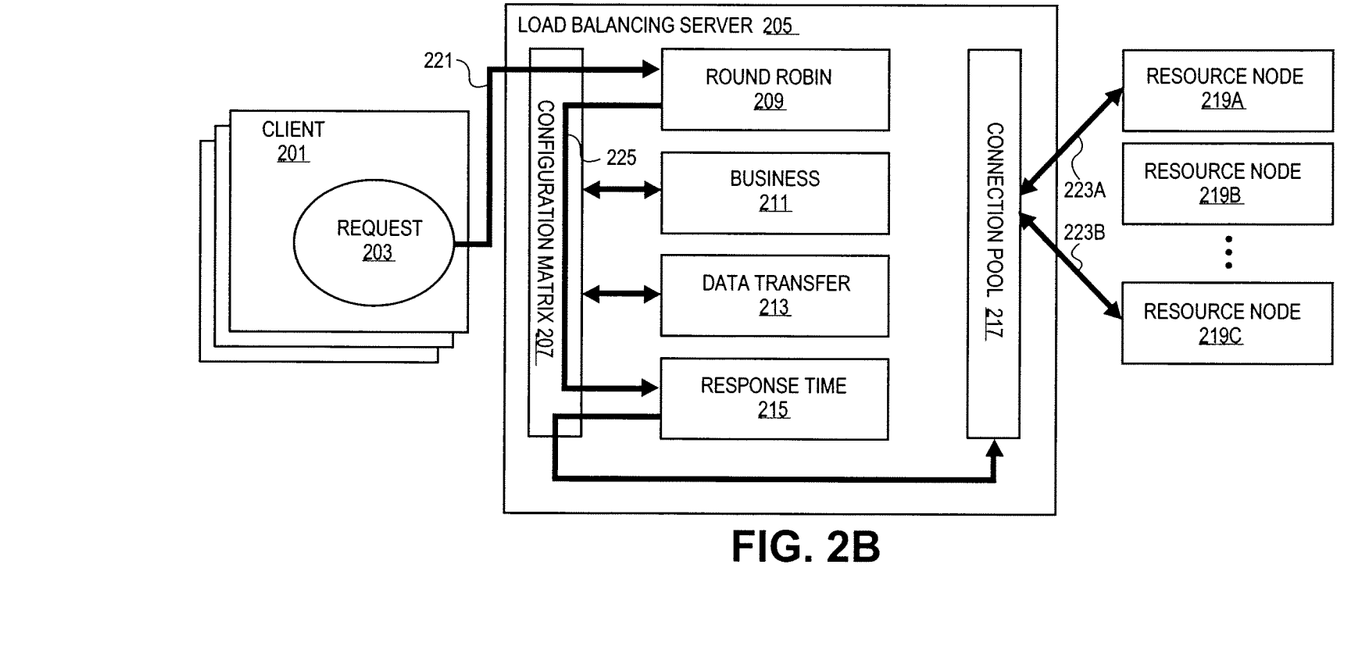
FIG. 2B is a diagram of a system for servicing resource requests utilizing multiple load balancing modules.

FIG. 2B is a diagram of system for servicing resource requests including multiple load balancing modules. The diagram illustrates the servicing of a specific request 203. The request 203 is received by the load balancing server 205 from a client 201. The configuration matrix 207 is then accessed or executed to determine, which load balancing modules are to be applied to the request. In the illustrated example, the request is sent to a round robin load balancing module 209. The round robin load balancing module 209 outputs a matrix with each of the available resource nodes ranked in the order of their selection according to the round robin scheme. For example, the values can be rankings with the next resource node to be selected assigned a value of 1 or a probability of selection or similar weighted or ordered value that indicates the order that each available resource node should be selected in. This result 225 is returned to the configuration matrix 207.

The configuration matrix 207 determines if any further load balancing modules are to be applied and forwards the results 225 to the next load balancing module for processing. In the illustrated example, the results 225 are forwarded to the response time load balancing module 215. The response time load balancing module 215 generates a similar result matrix based on current response times. The result matrix includes values that are ranks or orders of the available resource nodes. The new result matrix is then combined with the received result matrix 225 and returned to the configuration matrix 207. In another embodiment, the two result matrices are returned separately or the configuration matrix 207 collects the necessary result matrices without supplying them to the other load balancing modules. Any number or result matrices can be obtained from any number of load balancing modules. The results can be added, weighted and added, or similarly combined.

The resulting matrix can then be used to select the connection and resource node to be assigned to service the resource request. The highest or lowest value, depending on the implementation, can be used to select the resource node. The appropriate connection 223A is then established or retrieved from the connection pool 217. The request 203 is then sent to the selected resource node 219A to be serviced. The client and resource node can also continue to communicate over the established connection 223A.

Figure 3:
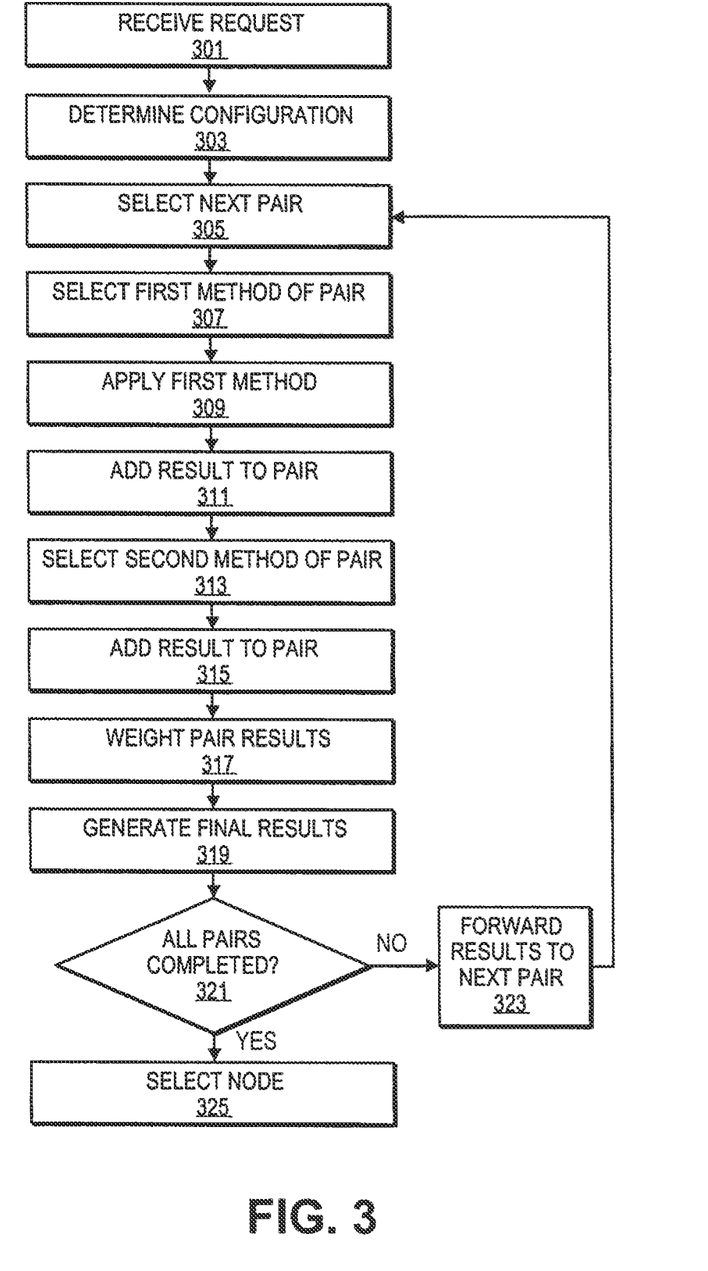
FIG. 3 is a flowchart of one embodiment of a process for selecting a connection and resource node to service a resource request.

FIG. 3 is a flowchart of one example embodiment of a process for selecting a connection and node to service a resource request. The process can be initiated in response to receiving a request for a resource from a client machine (block 301). The request is then processed according to a configuration matrix that has been configured by an administrator or similar user. The configuration matrix is accessed or executed to determine how the resource node to service the request is to be selected (block 303). A set of pairs of load balancing modules may be stored therein that determine the processing of each request. In another embodiment, other data structures including other types of lists, tables or similar data structures are utilized to track and select the order and application of the load balancing modules to select a resource node to service the request. The example of load balancing pairs is provided herein for purpose of example and other examples have been omitted for sake of clarity. One skilled in the art would understand how to utilize other data structures based on the principles described herein.

The first pair in the pair list is selected to be processed (block 305). The first load balancing module specified by the selected pair is then determined (block 307) and called (block 309). Any load balancing module, method, algorithm or similar load balancing scheme can be specified. The result from the load balancing module can be a matrix, array, list or similar data structure. The results will provide a ranking, order, probability or similar data related to each of the resource nodes. The results can be returned and stored by the configuration matrix, stored in the pair data structure or similarly tracked (block 311).

Upon receipt of the results or in parallel to the processing by the first load balancing module, a second load balancing module designated in the pair is selected (block 313) and called. The results from the first load balancing module can be provided to the second load balancing module. The second load balancing module can be any load balancing module and can apply any method, scheme or algorithm in determining a matrix, array, list or similar result data structure. In one embodiment, the result from the second load balancing module is returned to the configuration matrix, stored in the pair data structure or similarly stored (block 315). In another embodiment, the results of the second load balancing module are combined with the input results from the first load balancing module by the second load balancing module before being returned to the configuration module.

The results of each of the first and second load balancing modules are weighted based on a weighting scheme specified by the pair data structure (block 317). The weighting scheme allows the administrator to emphasize the results and importance of one load balancing module over another. Any weighting distribution can be applied as specified by the administrator (e.g., a first load balancing module may be weighted 0.8 or 80% while a second load balancing module is weighted 0.2 or 20%). The combination of the results of the first and second load balancing modules including the weighting of each value produces a matrix, array, list or similar data structure with values corresponding to each of the resource nodes (block 319).

A check is made to determine if all of the pairs in the pair list have been traversed (block 321). If all of the pairs in the pair list have been traversed then the result matrix is used to select a resource node with the highest value or ranking (or the lowest value or ranking depending on the implementation) (block 325). If additional pairs have been specified in the list then the result matrix is forwarded to the next pair to be combined with the results of the load balancing modules specified in the next pair (block 323). The next pair is selected (block 305) and the process continues until all of the pairs have been exhausted in the pair list.

Figure 4A:
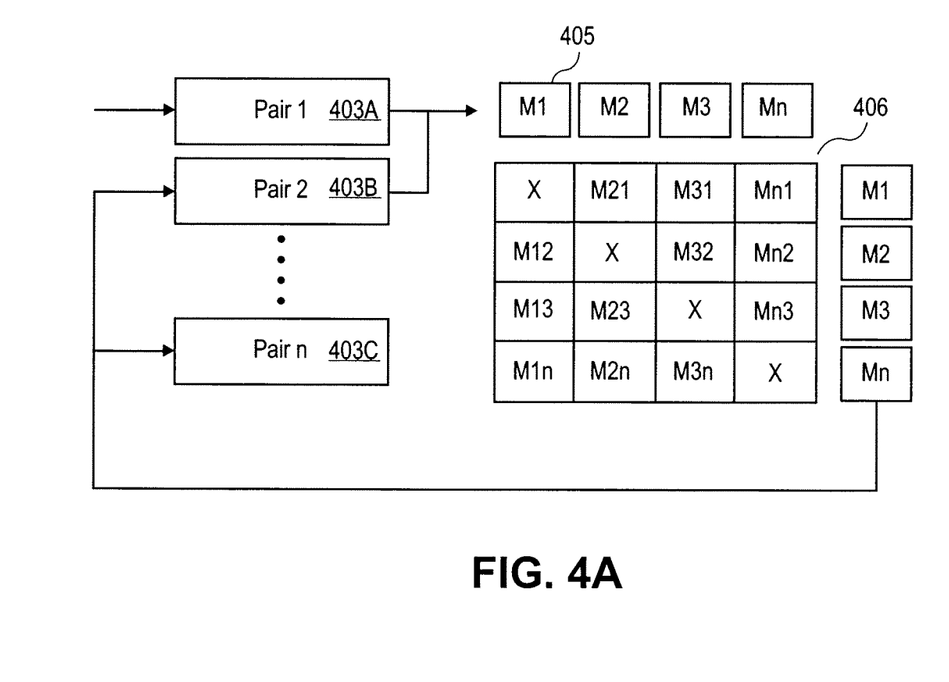
FIG. 4A is a diagram of one embodiment of a pair list and configuration matrix.

FIG. 4A is a diagram of one embodiment of a pair list and configuration matrix. In the illustrated example, a set of pairs 403A-C have been defined by an administrator to control the selection of resource nodes to service client requests. A configuration matrix 401 also sets forth the possible combination of load balancing modules. Each load balancing module is represented by a column 405 and labeled M1-Mn. Each of the combinations is represented as a cell in the table, where the rows also correspond to the same load balancing modules. The 'x' cells of the matrix indicate that only a single load balancing module is present in that pair, which can be used when an odd number of load balancing modules are to be applied.

Figure 4B:
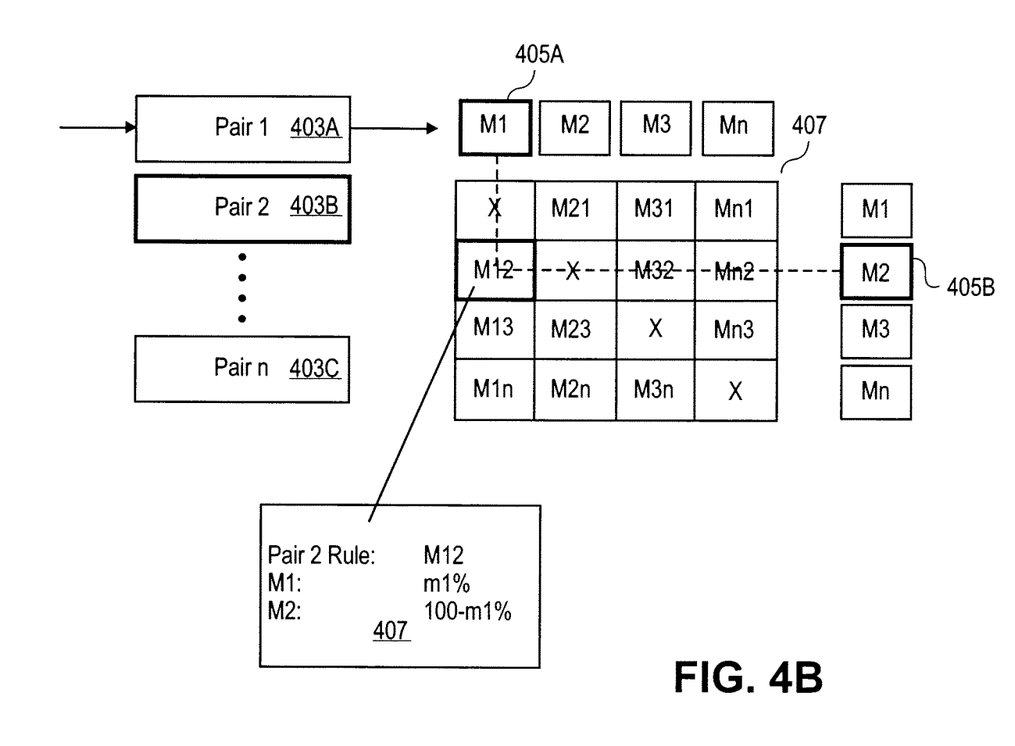
FIG. 4B is a diagram of one embodiment of a pair list and configuration matrix including a rule of a first pair.

FIG. 4B is a diagram of one embodiment of a pair list and configuration matrix including a rule of a first pair. The application of the illustrated pair list starts with the first pair 403A. That pair 403A includes a reference or defines the combination of the load balancing module 405A with the load balancing module 405B. The rule corresponding to this cell of the configuration matrix is show in rule 407. The rule 407 specifies the order for applying the load balancing modules (M1 then M2) and the weighting of the results for each of the modules.

Figure 4C:
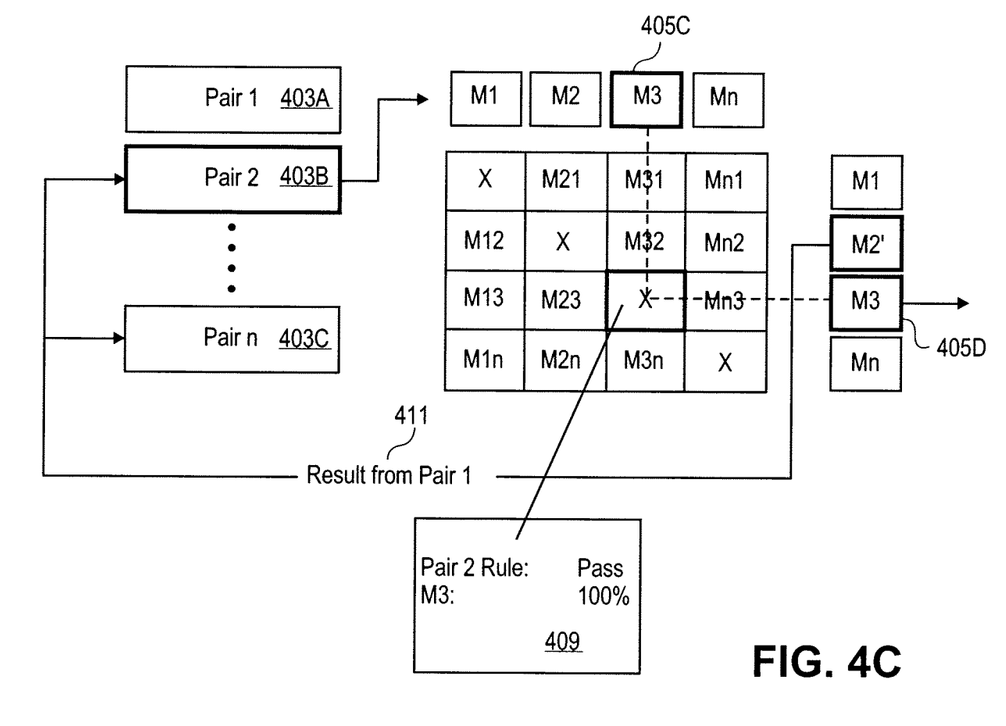
FIG. 4C is a diagram of one embodiment of a pair list and configuration matrix including a rule of a second pair.

FIG. 4C is a diagram of one embodiment of a pair list and configuration matrix including a rule of a second pair. The processing of the request of FIG. 4B is continued with the results 411 of the first pair 403A being forwarded to the next pair 403B. The next pair 403B is then processed. In the illustrated example, the next pair 403B only specifies a single load balancing method 405C,D. This method is applied and the results combined with those of pair 1. The rule 409 specifies that no weighting (i.e. 100% for one pair result) is to be applied. The results of this pair 403B can be output or forwarded to any further pairs 403C.

For sake of further illustration and clarity, a specific example of combining and implementing a round robin load balancing method and a response time method is provided. These two load balancing methods are defined in a load balancing pair. The administrator may recognize that a round robin system is not sufficient to give the level of optimization desired because it is too simplistic and the administrator desires to modify the round robin to take response time into account.

In this example, four resource nodes are present in the system (B1, B2, B3, B4). The round robin scheme is currently pointing to the resource B1, then B2, B3 and B4 follow in order. These resource nodes are currently assigned values B1:1, B2:2, B3:3 and B4:4, i.e., a ranking under the round robin scheme. In the next iteration of the round robin, these values would be rotated to B1:4, B2:1, B3:2 and B4:3. These values are normalized using the formula:

$$Bx=Pos(x)*100/(1+2+3+4)$$

where Pos(x) is a function to determine the position of a resource node in the round robin scheme. So B1=1*100/(10) or B1=10. In this case, B1=10, B2=20, B3=30 and B4=40. These weighted or ordered values are then provided as a data structure to the next load balancing module.

The response time load balancing module tracks the response times of each resource node. The response times may be normalized using a formula $Bx=100-100/(Bx:rt*100$ $(B1:rt+B2:rt \ldots Bx:rt))$. Normalization provides a relationship between values of the different load balancing methods (i.e., placing them on a scale of 0-100) that gives their combination meaning such that better response times and lower order in a round robin scheme can be combined to produce a combined value for a resource node that indicates that it should be chosen over other resource nodes with slower response times and lower order in the round robin scheme.

The normalized results for each of the load balancing modules are combined based on a weighting scheme specified by an administrator. For example, a final value for each resource node can be defined as $Bx=(Rrx*0.8+Rtx*0.2)/2$, where Bx is the node, Rrx is the round robin result for that node and Rtx is the response time result for that node. In this example, the round robin result is weighted more heavily (0.8) than the response time (0.2) to obtain a desired result of modifying a round robin result to take into account response times. The resulting Bx with the highest value is chosen to service the request.

Thus, a method and apparatus for balancing a load across a set of nodes providing a set of resources has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
  receiving a request for a resource provided by a plurality of nodes;
  iterating through a list of load balancing module pairs, each load balancing module pair comprising a different set of one or more load balancing modules, each of the one or more load balancing modules to provide a distinct methodology to select one of the plurality of nodes to service the request, wherein each iteration for a load balancing module pair comprises:
    receiving a first result from a first load balancing module in the load balancing module pair, the first load balancing module providing a first methodology, the first result comprising a first ordered list of the plurality of nodes ranked according to the first methodology,
    applying the first result, determined using the first methodology, to a second load balancing module in the load balancing module pair, the second load balancing module providing a second methodology,
    receiving a second result from the second load balancing module, the second result comprising a re-ranking of the first ordered list determined according to the second methodology, and
    storing the second result in a result matrix as a pair result for the load balancing module pair; and
  selecting, by a processing device, one of the plurality of nodes with a highest ranking pair result in the result matrix among each of the load balancing module pairs in the list to service the request.

2. The method of claim 1, wherein the first result is weighted separately from the second result.

3. The method of claim 1, wherein the first result includes an ordered value for each of the plurality of nodes.

4. The method of claim 1, further comprising:
  returning a connection to the one of the plurality of nodes with the highest ranking in the result matrix.

5. The method of claim 1, wherein the second result is a matrix of values for each of the plurality of nodes that are normalized with the first result.

6. The method of claim 1, further comprising:
  maintaining a configuration matrix of available load balancing module combinations.

7. A non-transitory computer readable medium, having instructions stored therein, which when executed, cause a processing device to:
  receive a request for a resource provided by a plurality of nodes;
  iterate through a list of load balancing module pairs, each load balancing module pair comprising a different set of one or more load balancing modules, each of the one or more load balancing modules to provide a distinct methodology to select one of the plurality of nodes to service the request, wherein for each iteration for a load balancing module pair, the instructions to cause the processing device to:
    receive a first result from a first load balancing module in the load balancing module pair, the first load balancing module providing a first methodology, the first result comprising a first ordered list of the plurality of nodes ranked according to the first methodology,
    apply the first result, determined using the first methodology, to a second load balancing module in the load balancing module pair, the second load balancing module providing a second methodology,
    receive a second result from the second load balancing module, the second result comprising a re-ranking of the first ordered list determined according to the second methodology, and
    store the second result in a result matrix as a pair result for the load balancing module pair; and
  select, by the processing device, one of the plurality of nodes with a highest ranking pair result in the result matrix among each of the load balancing module pairs in the list to service the request.

8. The non-transitory computer readable medium of claim 7, wherein first result is weighted separately from the second result.

9. The non-transitory computer readable medium of claim 7, wherein the first result includes an ordered value for each of the plurality of nodes.

10. The non-transitory computer readable medium of claim 7, having further instructions stored therein, which when executed cause the processing device to:
  return a connection to the one of the plurality of nodes with the highest ranking in the result matrix.

11. The non-transitory computer readable medium of claim 7, wherein the second result is a matrix of values for each of the plurality of nodes that are normalized with the first result.

12. The non-transitory computer readable medium of claim 7, having further instructions stored therein, which when executed cause the processing device to:
maintain a configuration matrix of available load balancing module combinations.

13. A system comprising:
a plurality of load balancers, each load balancer of the plurality of load balancers to determine a connection to one of a plurality of nodes using a different methodology; and
a processing device coupled to the plurality of load balancers, to manage a request for a resource provided by the plurality of nodes by iterating through a plurality of load balancing module combinations, each combination comprising a different set of one or more of the plurality of load balancers, wherein each iteration for a combination comprises
receiving a first result from a first load balancer in the combination, the first load balancer using a first methodology, the first result comprising a first ordered list of the plurality of nodes ranked according to the first methodology,
applying the first result, determined using the first methodology, to a second load balancer in the combination, the second load balancer using a second methodology,
receiving a second result from the second load balancer, the second result comprising a re-ranking of the first ordered list determined according to the second methodology, and
storing the second result in a result matrix as a combination result for the combination,
the processing device to select a connection to one of the plurality of nodes with a highest ranking combination result from the result matrix among each of the plurality of combinations, wherein the configuration matrix module tracks load balancer pair combinations.

14. The system of claim 13, further comprising:
a connection module to track and manage available connections and data transfers with the plurality of nodes.

15. The system of claim 13, wherein the configuration matrix module tracks result weighting in a pair list.

16. The system of claim 13, further comprising:
the plurality of nodes to provide the resource.

17. The system of claim 13, wherein the first result from the first load balancer and the second result from the second load balancer are weighted separately.

18. The system of claim 17, wherein the first result includes an ordered value for each of the plurality of nodes.

* * * * *